(12) United States Patent
Hanmann et al.

(10) Patent No.: US 6,892,217 B1
(45) Date of Patent: May 10, 2005

(54) MOBILE TERMINAL FOR DISPLAYING A RICH TEXT DOCUMENT COMPRISING CONDITIONAL CODE FOR IDENTIFYING ADVERTISING INFORMATION STORED LOCALLY OR ON THE INTERNET

(75) Inventors: Jonathan Lee Hanmann, Corona, CA (US); Anil Sareen, Mission Viejo, CA (US); Kenneth J. Smith, Corona, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 796 days.

(21) Appl. No.: 09/888,275

(22) Filed: Jun. 22, 2001

Related U.S. Application Data

(62) Division of application No. 09/848,797, filed on May 4, 2001.

(51) Int. Cl.[7] .............................................. G06F 13/00
(52) U.S. Cl. ........................ 709/200; 709/203; 709/217; 709/219; 709/224
(58) Field of Search ................................. 709/200–203, 709/217–219, 223–224, 227

(56) References Cited

U.S. PATENT DOCUMENTS

| | | | |
|---|---|---|---|
| 5,809,242 A | 9/1998 | Shaw et al. | |
| 5,987,480 A | 11/1999 | Donohue et al. | |
| 6,021,426 A | 2/2000 | Douglis et al. | |
| 6,085,229 A | 7/2000 | Newman et al. | |
| 6,141,010 A | 10/2000 | Hoyle | |
| 6,157,946 A | 12/2000 | Itakura et al. | |
| 6,526,350 B2 * | 2/2003 | Sekiyama | 701/209 |
| 6,647,257 B2 * | 11/2003 | Owensby | 455/414.1 |
| 6,647,269 B2 * | 11/2003 | Hendrey et al. | 455/456.3 |
| 6,738,808 B1 * | 5/2004 | Zellner et al. | 709/223 |

* cited by examiner

*Primary Examiner*—Moustafa M. Meky
(74) *Attorney, Agent, or Firm*—Milad G. Shara, Esq.; Howard H. Sheerin, Esq.

(57) ABSTRACT

A method and apparatus are disclosed for transmitting advertising information to a mobile terminal over a first connection during a synchronization session and storing the advertising information in a local memory of the mobile terminal. A rich text document is transmitted to the mobile terminal over a second connection, wherein the rich text document comprises conditional code comprising advertising display criteria including a first identifier for retrieving selected advertising information stored in the local memory of the mobile terminal and a second identifier for downloading the selected advertising information from the Internet.

62 Claims, 9 Drawing Sheets

MOBILE TERMINAL FOR DISPLAYING A RICH TEXT DOCUMENT COMPRISING CONDITIONAL CODE FOR IDENTIFYING ADVERTISING INFORMATION STORED LOCALLY OR ON THE INTERNET

This application is a division of 09/848,797 filed on May 4, 2001.

BACKGROUND OF THE INVENTION

1. Field of the Invention

The present invention relates to mobile terminals. More particularly, the present invention relates to a mobile terminal for displaying a rich text document comprising conditional code for identifying advertising information stored locally or on the Internet.

2. Description of the Prior Art

Mobile terminals, such as handheld computers, cellular phones, tablet computers, etc., may be used to view rich text documents, such as web pages from Internet web sites, email messages with embedded images, and PDF files. The mobile terminal may be used to view rich text documents downloaded from the Internet directly, or that have been cached in the local memory of the mobile terminal during a synchronization session. FIG. 1 shows a prior art configuration for synchronizing a mobile terminal 2 to a target computer 4 over a direct, wired connection 6 (e.g., a USB connection). The target computer 4 downloads rich text documents such as web pages from selected web sites off the Internet and transmits the web pages to the mobile terminal 2. The user is then able to view the web pages on the mobile terminal 2 while away from the target computer, such as while traveling. However, the web pages stored in the mobile terminal 2 may eventually become outdated and need to be refreshed through another synchronization session with the target computer 4. If the user is away from the target computer 4, the mobile terminal 2 must be synchronized remotely.

FIG. 2 shows prior art configurations for remotely synchronizing the mobile terminal 2 to the target computer 4 via the Internet 8. In one configuration, the mobile terminal 2 accesses the Internet 8 over a wired connection 10 (e.g., telephone lines) and an Internet service provider (ISP) 12. In another configuration, the mobile terminal 2 accesses the Internet over a wireless network such as a cellular provider network (CPN) 14 or a short range wireless access point (WAP) 15, such as Bluetooth, 802.11b, or HomeRF. In either case the bandwidth of the communication channel is typically much less as compared to the bandwidth of the direct, wired connection as in FIG. 1, thereby increasing the latency in accessing the data as well as decreasing battery life. Further, a CPN 14 typically charges a higher connection fee. It is therefore desirable to minimize the amount of information exchanged between the mobile terminal 2 and the target computer 4 when synchronizing remotely in order to minimize the synchronization time, conserve battery power, and minimize the connection fees.

Similarly, it is desirable to minimize the amount of information transmitted to the mobile terminal 2 while browsing the Internet over a low bandwidth (and potentially expensive) connection such as a wireless connection. The prior art has suggested to cache static information associated with a web site within the mobile terminal 2 and transmit only the dynamic information to reduce the amount of data transmitted to the mobile terminal. However, advertising information in this context is considered dynamic information since it is updated on a periodic basis (e.g., banner ads are rotated).

FIG. 3 illustrates a prior art mobile terminal displaying advertising information in the form of banners 16A and 16B which may be any geometric shape (e.g., rectangular or square) and which typically comprise an image such as a .JPG or .GIF image file. When the user clicks on the banner, a web page is displayed having information related to the product or service advertised. Although the banners are typically compressed, they contain a relatively large number of bytes as compared to other web page content such as text. Banner ads are also evolving into larger formats with richer content, such as animated .GIF files, which consume even more memory. The click-through rate of banner advertising is also typically very low (e.g., less than two percent) although still high enough to justify the expense for advertisers. Thus, bandwidth is consumed to transmit the banner ads to the mobile terminal during a remote synchronization or wireless browsing session even though a majority of the time the user will not click on the banner ads.

Yet another drawback associated with banner advertising is the delay associated with downloading the banners from banner servers. Many Internet web sites use an advertising agency to "serve" the banners with the site's content. This minimizes the overhead associated with managing banner advertising while still generating revenue for the web site. Each time the web site displays a web page, a banner is downloaded from a banner server of the advertising agency and displayed within the web page. However, the banner servers are often saturated with thousands of requests to serve banners, thereby delaying the transmission of the web page to the user.

There is, therefore., a need to enhance the performance in transmitting information to a mobile terminal, particularly with respect to synchronizing remotely or browsing the Internet wirelessly, so as to minimize the access latency, conserve battery power, and minimize connection fees.

SUMMARY OF THE INVENTION

The present invention may be regarded as a method of operating a mobile terminal comprising a local memory and a screen. During a synchronization session, advertising information is received over a first connection and stored in the local memory of the mobile terminal. A rich text document is received over a second connection, wherein the rich text document comprises conditional code comprising advertising display criteria including a first identifier for retrieving selected advertising information stored in the local memory of the mobile terminal and a second identifier for downloading the selected advertising information from the Internet. The first identifier in the rich text document is processed to determine whether the selected advertising information associated with the rich text document is stored in the local memory of the mobile terminal, and the selected advertising information is retrieved if stored in the local memory of the mobile terminal. If the selected advertising information is not stored in the local memory of the mobile terminal, the second identifier is processed to download the selected advertising information from the Internet. The rich text document is displayed on the screen of the mobile terminal together with the selected advertising information.

In one embodiment the first connection operates at a first bandwidth, the second connection operates at a second bandwidth, and the first bandwidth is substantially greater than the second bandwidth. For example, in one embodiment the first connection comprises a wired connection and the second connection comprises a wireless connection.

In one embodiment, the conditional code comprises hypertext markup language (HTML) tags. For example, in one embodiment the first identifier comprises a first HTML tag, and the second identifier comprises a second HTML tag. In one embodiment, the second identifier comprises a universal resource locator (URL).

In one embodiment, the advertising information comprises a plurality of banner ads. In one embodiment, the plurality of banner ads are displayed with the rich text document in a predetermined rotation. In one embodiment, a type indicator is associated with each banner ad wherein the type indicator is used to select a banner ad from the local memory for display with the rich text document.

In one embodiment the rich text document is transmitted to the mobile terminal over the second connection during a subsequent synchronization session. In an alternative embodiment the rich text document is transmitted to the mobile terminal over the second connection during a browsing session.

In one embodiment during the synchronization session the inventory of advertising information stored in the local memory of the mobile terminal is evaluated, and updated advertising information is selectively transmitted to the mobile terminal relative to the inventory of advertising information. In one embodiment the updated advertising information displaces outdated advertising information stored on the mobile terminal.

In another embodiment, the local memory of the mobile terminal stores tracking information identifying the advertising information retrieved from the local memory and displayed with the rich text document, wherein the tracking information is transmitted from the mobile terminal to a target computer. In one embodiment, the tracking information further comprises click-through data indicating a click-through rate for the advertising information displayed with the rich text document.

In yet another embodiment, the advertising information comprises linked rich text documents wherein during the synchronization session, the linked rich text documents are transmitted to the mobile terminal over the first connection and stored in the local memory.

The present invention may also be regarded as a mobile terminal for communicating with a target computer. The mobile terminal comprises a local memory for storing advertising information received from the target computer over a first connection during a synchronization session, and a screen. The mobile terminal further comprises a terminal controller for receiving rich text document over a second connection, wherein the rich text document comprises conditional code comprising advertising display criteria including a first identifier for retrieving selected advertising information stored in the local memory of the mobile terminal and a second identifier for downloading the selected advertising information from the Internet. The terminal controller processes the first identifier in the rich text document to determine whether the selected advertising information associated with the rich text document is stored in the local memory of the mobile terminal, and retrieves the selected advertising information if stored in the local memory of the mobile terminal. If the selected advertising information is not stored in the local memory of the mobile terminal, the terminal controller processes the second identifier to download the selected advertising information from the Internet. The terminal controller displays the rich text document on the screen of the mobile terminal together with the selected advertising information.

The present invention may also be regarded as a computer program embodied on a computer readable storage medium for use in a mobile terminal comprising a local memory and a screen. The computer program comprises code segments for:

during a synchronization session, receiving advertising information over a first connection and storing the advertising information in the local memory of the mobile terminal;

receiving a rich text document over a second connection, wherein the rich text document comprises conditional code comprising advertising display criteria including a first identifier for retrieving selected advertising information stored in the local memory of the mobile terminal and a second identifier for downloading the selected advertising information from the Internet;

processing the first identifier in the rich text document to determine whether the selected advertising information associated with the rich text document is stored in the local memory of the mobile terminal, and retrieving the selected advertising information if stored in the local memory of the mobile terminal;

if the selected advertising information is not stored in the local memory of the mobile terminal, processing the second identifier to download the selected advertising information from the Internet; and displaying the rich text document on the screen of the mobile terminal together with the selected advertising information.

The present invention may also be regarded as a method of transmitting data to a mobile terminal, the mobile terminal comprising a local memory and a screen. During a synchronization session, advertising information is transmitted to the mobile terminal over a first connection, the local memory of the mobile terminal for storing the advertising information. A rich text document is transmitted to the mobile terminal over a second connection, wherein the rich text document comprises conditional code comprising advertising display criteria including a first identifier for retrieving selected advertising information stored in the local memory of the mobile terminal and a second identifier for downloading the selected advertising information from the Internet.

The present invention may also be regarded as a computer program embodied on a computer readable storage medium for transmitting data to a mobile terminal, the mobile terminal comprising a local memory and a screen. The computer program comprises a code segment for transmitting advertising information to the mobile terminal over a first connection during a synchronization session, the local memory of the mobile terminal for storing the advertising information. The computer program further comprising a code segment for transmitting a rich text document to the mobile terminal over a second connection, wherein the rich text document comprises conditional code comprising advertising display criteria including a first identifier for retrieving selected advertising information stored in the local memory of the mobile terminal and a second identifier for downloading the selected advertising information from the Internet.

DESCRIPTION OF THE PREFERRED EMBODIMENTS

Figure 1:
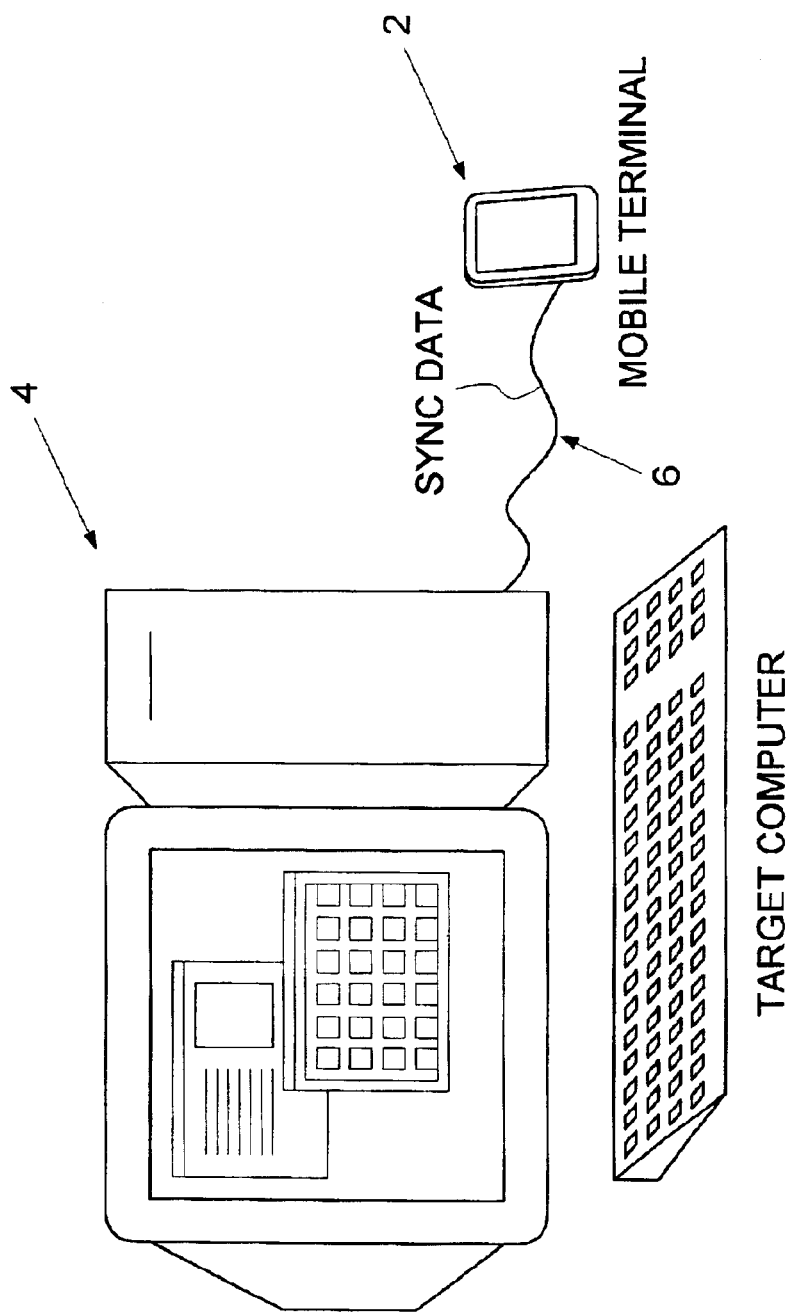
FIG. 1 shows a prior art configuration wherein a mobile terminal is synchronized to a target computer over a direct wired connection.
Figure 2:
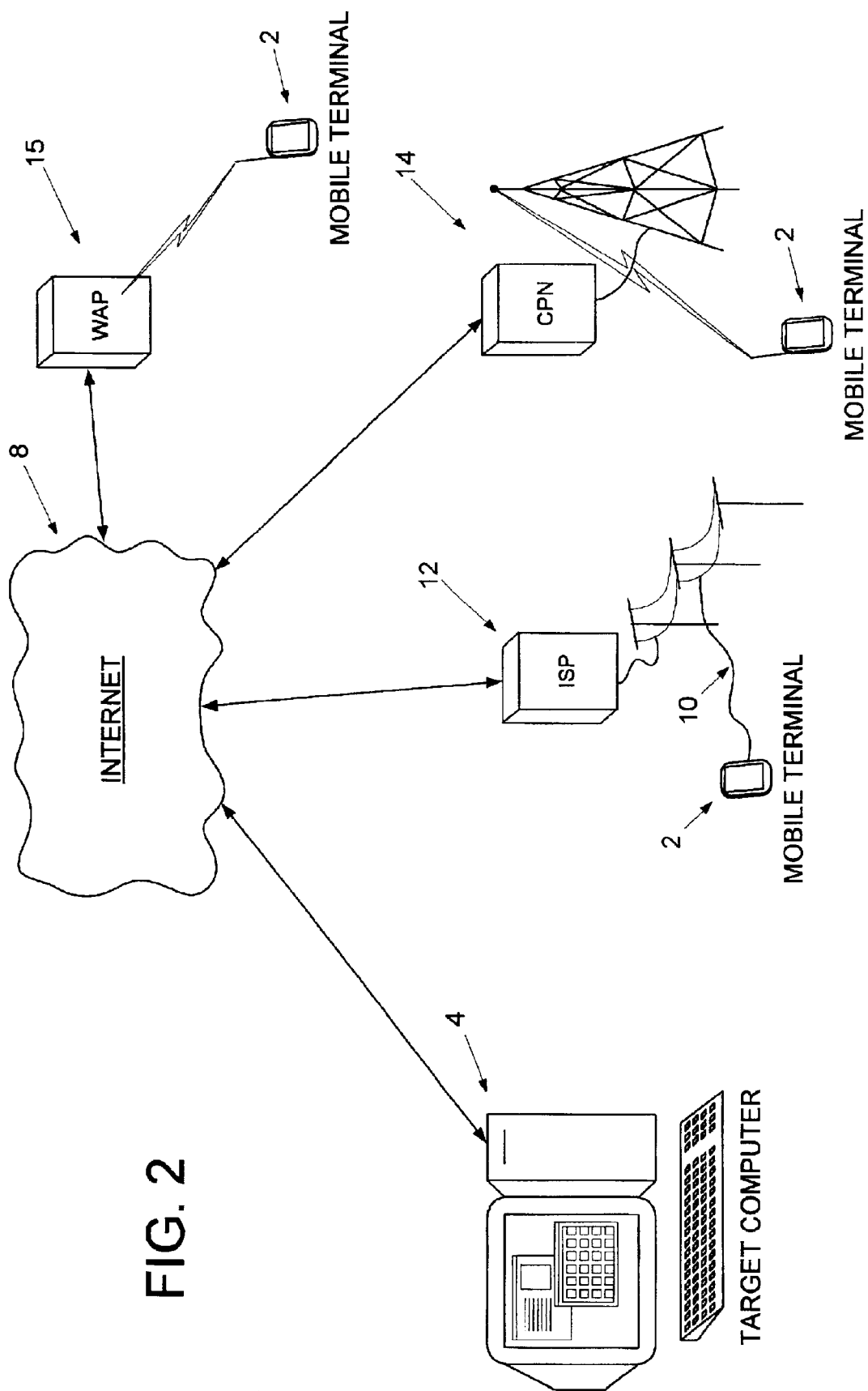
FIG. 2 shows a prior art configuration wherein a mobile terminal is synchronized remotely to the target computer over telephone land lines or over a wireless network via the Internet.
Figure 3:
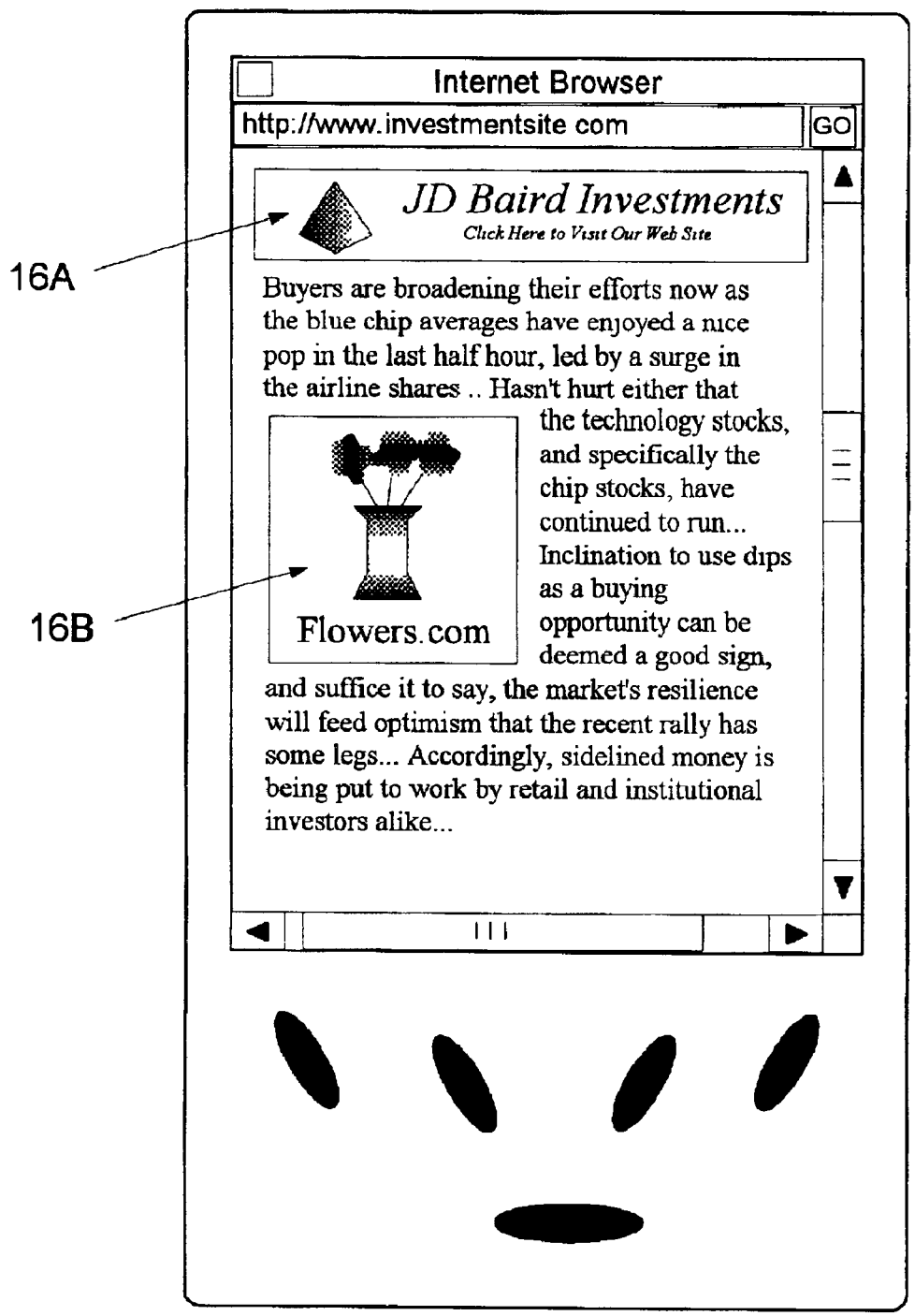
FIG. 3 shows a prior art mobile terminal for displaying advertising information, such as banner ads, together with a rich text document (e.g., a web page) downloaded from the Internet or from a target computer during a remote synchronization session.
Figure 4:
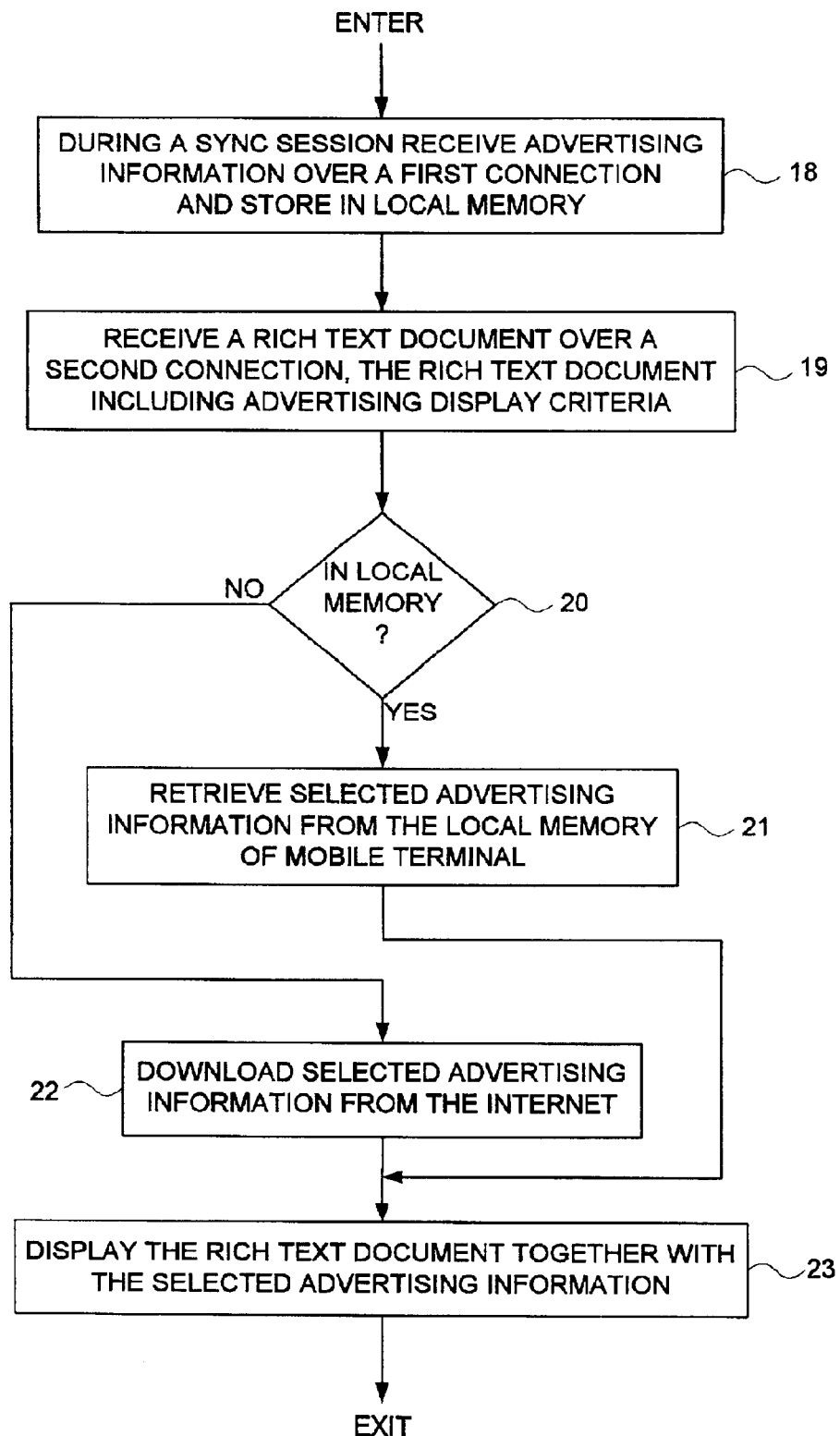
FIG. 4 is a flow chart according to an embodiment of the present invention illustrating how advertising information is received over a first connection during a synchronization session and stored in the local memory of a mobile terminal, and displayed during a browsing session with a rich text document received over a second connection.

FIG. 4 shows a flow chart according to an embodiment of the present invention illustrating a method of operating a mobile terminal comprising a local memory and a screen. During a synchronization session (at step 18) advertising information is received over a first connection and stored in the local memory of the mobile terminal. At step 19 a rich text document is received over a second connection, wherein the rich text document comprises conditional code comprising advertising display criteria including a first identifier for retrieving selected advertising information stored in the local memory of the mobile terminal and a second identifier for downloading the selected advertising information from the Internet. At step 20 the first identifier in the rich text document is processed to determine whether the selected advertising information associated with the rich text document is stored in the local memory of the mobile terminal, and at step 21 the selected advertising information is retrieved if stored in the local memory of the mobile terminal. If the selected advertising information is not stored in the local memory of the mobile terminal, then at step 22 the second identifier is processed to download the selected advertising information from the Internet. At step 23 the rich text document is displayed on the screen of the mobile terminal together with the selected advertising information.

In one embodiment, the first connection operates at a first bandwidth, the second connection operates at a second bandwidth, and the first bandwidth is substantially greater than the second bandwidth. For example, in one embodiment the first connection may be a wired connection, such as a local USB connection, and the second connection may be a wireless connection.

In one embodiment, the advertising information comprises a plurality of banner ads. In one embodiment, the banner ads stored in the local memory of the mobile terminal are displayed with the rich text document in a predetermined rotation. For example, in one embodiment the banner ads are rotated each time the rich text document is redisplayed. In another embodiment the banner ads are rotated at a predetermined interval while displaying the rich text document.

In one embodiment, the advertising display criteria comprises a location within the rich text document to display the selected advertising information. Any suitable method may be employed for incorporating the display criteria into the rich text document, such as HTML or XML code. An example code segment incorporated into a rich text document is shown below:

<p align="center">
<a href="http://www.flowers.com">
<img src local="adv #5" border="0" width="468" height="60">
</a></p>

In the above code segment, the "align" tag specifies the banner ad is to be displayed with a center alignment. The "href" tag specifies the URL of the page to display if the banner ad is clicked on. The "img src local" tag specifies that the banner ad image is stored locally on the mobile terminal as "adv #5". The "border", "width" and "height" tags specify the physical characteristics of the banner ad (in this example, no border, width of 468 pixels and height of 60 pixels).

An alternative example code segment incorporated into a rich text document is shown below:

<p align="center">
<a href="http://www.flowers.com">
<img src local="BUSINESS" border="0" width="468" height="60">
</a></p>

In this embodiment, the "img src local" tag specifies that the banner ad image is stored locally as type "BUSINESS". When processing this code, the mobile terminal will retrieve the next BUSINESS type banner ad in the rotation for display with the rich text document.

Yet another example code segment incorporated into a rich text document is shown below:

<p align="center">
<a href="http://www.flowers.com">
<img src local="adv #5" border="0" width="468" height="60">
<img src="http://www.flowers.com/banner5.jpg" border="0" width="468" height="60">
</a></p>

In this embodiment, the "img src" tag specifies an alternative Internet address (e.g., URL) for the banner ad image for downloading from the Internet in the event the mobile terminal does not currently have "adv #5" stored in its local memory. This embodiment may also facilitate browsing devices that do not cache advertising information or cannot interpret the "img src local" tag.

Figure 5:
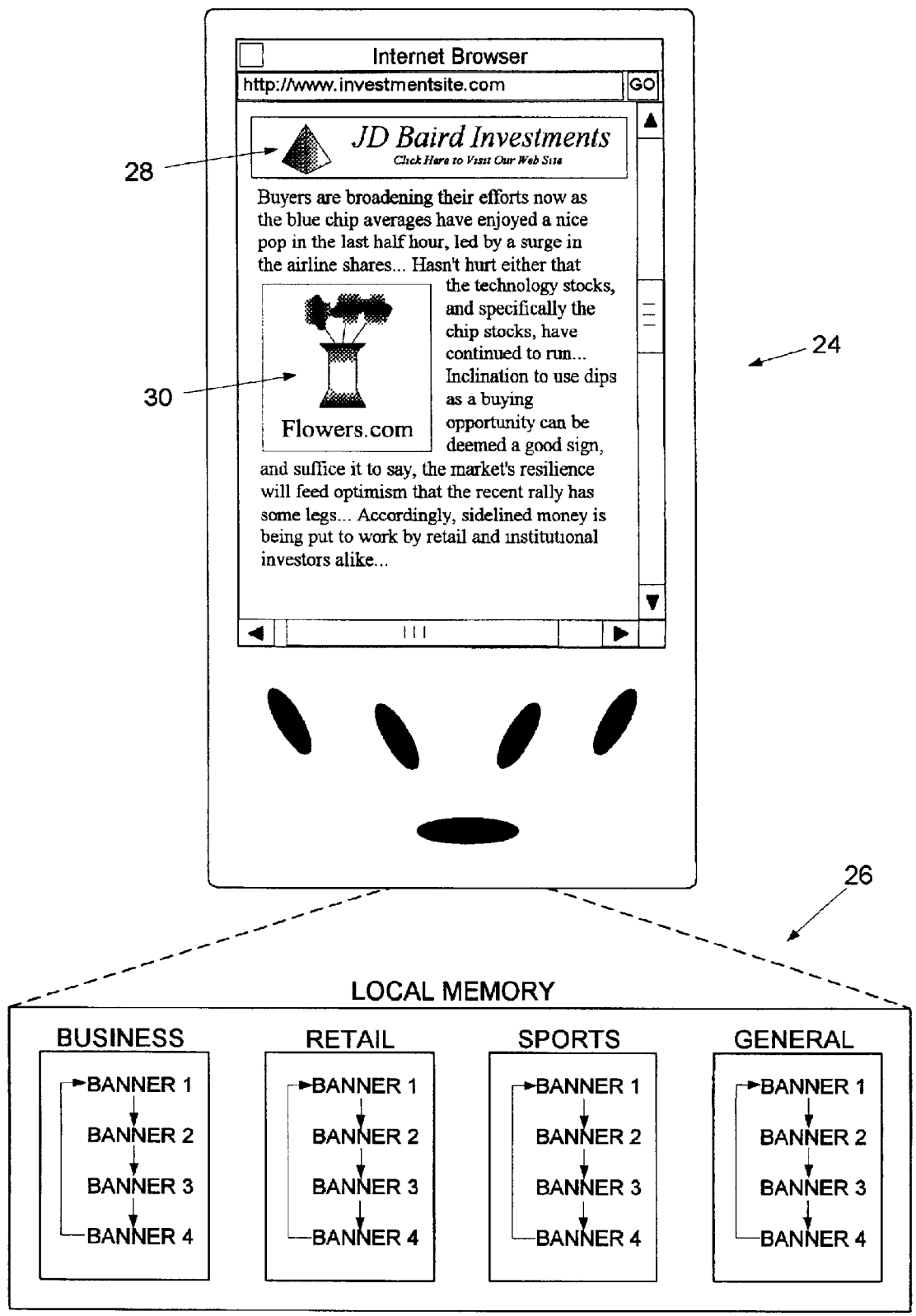
FIG. 5 shows a mobile terminal according to an embodiment of the present invention wherein the advertising information comprises a plurality of banner ads stored in the local memory by type (e.g., Business, Retail, etc.) and selected by type to be displayed with a related rich text document.

In yet another embodiment, a type indicator is associated with each banner ad, wherein the type indicator is used to select a banner from the local memory for display with the rich text document. This embodiment is illustrated in FIG. 5 which shows a mobile terminal 24 comprising a local memory 26 for storing a plurality of banner ads by type. In the example of FIG. 5, the banner ads include four types: BUSINESS, RETAIL, SPORTS and GENERAL. When a rich text document is displayed related to one of these areas of interest, a corresponding banner is selected from the appropriate category. For example, the mobile terminal 24 of FIG. 5 is displaying a web page from a finance web site. The web page indicates that the banner ad 28 at the top of the page should be of type "BUSINESS", and therefore the mobile terminal 24 retrieves a BUSINESS type banner from the local memory 26. The web page may indicate the second banner ad 30 is of type "GENERAL" meaning a GENERAL type banner should be displayed. In one embodiment, the banner ads for each type are rotated within each category as shown in FIG. 5.

Figure 6A:
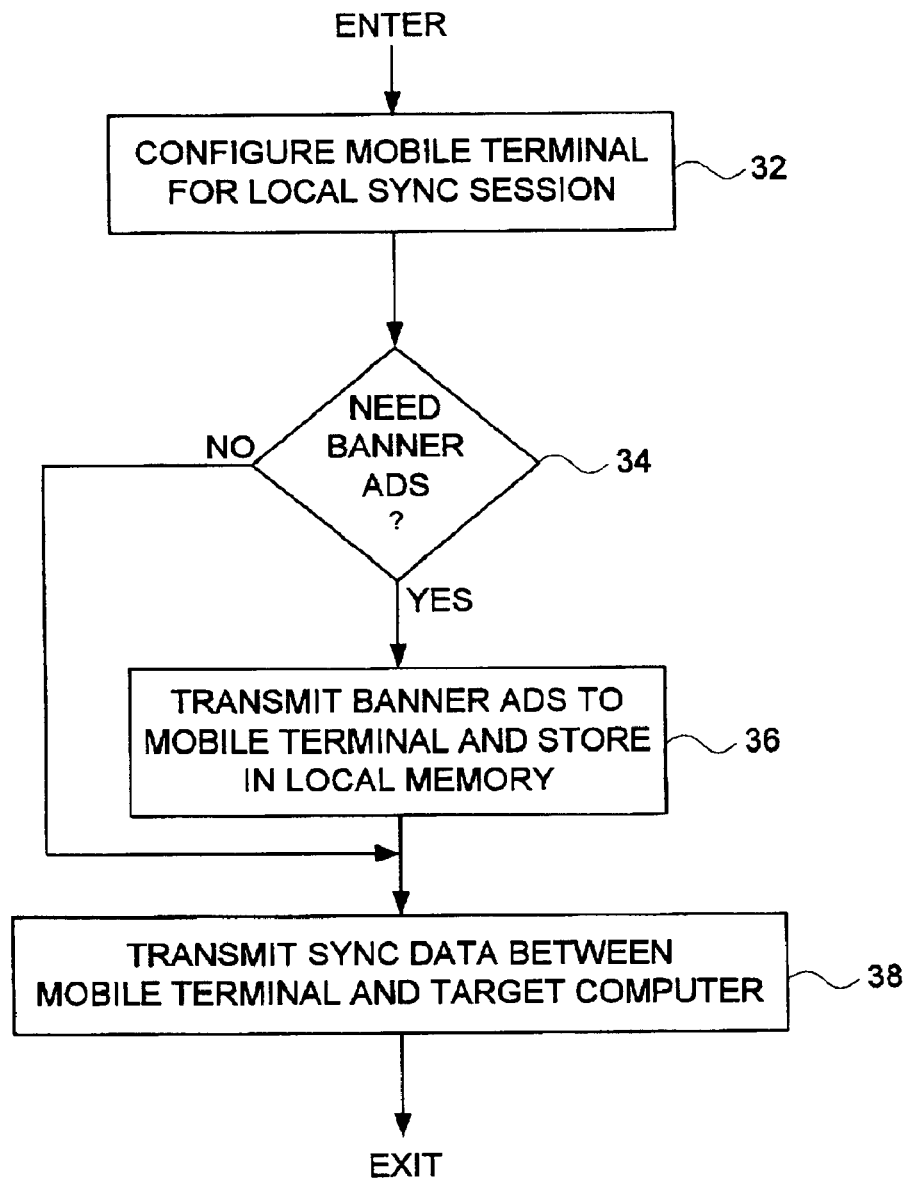
FIG. 6A is a flow chart according to an embodiment of the present invention illustrating how banner ads are cached within the mobile terminal while synchronizing locally over a high bandwidth connection (such as a local USB connection) to a target computer.

FIG. 6A is a flow chart according to an embodiment of the present invention illustrating how banner ads are stored in the mobile terminal while synchronizing locally over a high bandwidth connection (such as a local USB connection) to a target computer. At step 32 the mobile terminal is configured for a local synchronization session, and at step 34 the inventory of banner ads currently stored in the local memory of the mobile terminal is evaluated to determine whether the inventory should be updated. In one embodiment, the "expiration" information for each banner is stored within the mobile terminal, and the mobile terminal determines when to update outdated banner ads with new banner ads. For example, a banner ad may expire after having been displayed a predetermined number of times, or after a predetermined date. In another embodiment, the target computer evaluates the inventory of banner ads stored in the mobile terminal to determine which banner ads should be replaced. At step 36 the new banners are transmitted from the target computer and stored in the local memory of the mobile terminal. At step 38, other synchronization data, such as updated personal information management (PIM) data, is exchanged between the mobile terminal and target computer as part of the synchronization session. In one embodiment, only advertising information is transmitted to the mobile terminal during the synchronization session.

Figure 6B:
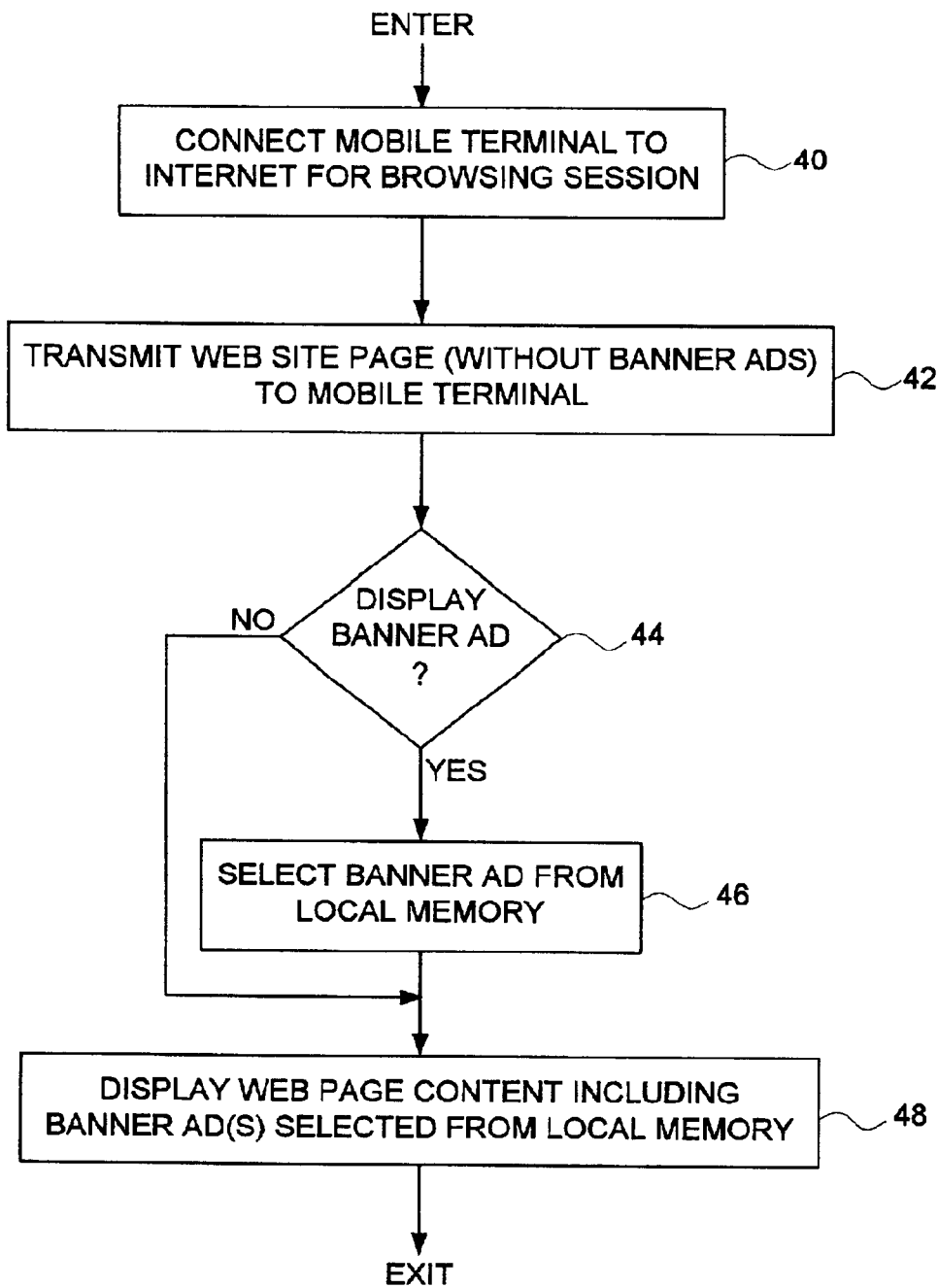
FIG. 6B is a flow chart according to an embodiment of the present invention illustrating how web pages are received over the second connection during a browsing session and displayed together with banner ads selected from the local memory.

FIG. 6B is a flow chart according to an embodiment of the present invention illustrating how a mobile terminal downloads web page content from the Internet during an on-line browsing session and selects the appropriate banner ads from local memory for viewing with the web page content. At step 40 the mobile terminal is connected to the Internet, for example over a wireless connection, to initiate the on-line browsing session. At step 42 a web page is transmitted to the mobile terminal without the images for at least one of the banner ads incorporated into the web page content. At step 44 the mobile terminal evaluates the web page to determine whether a banner ad should be displayed that is stored in the local memory of the mobile terminal, and if so, at step 46 the banner ad is selected from the local memory. At step 48 the web page content is displayed on the mobile terminal together with the banner ad selected from the local memory. This enhances the performance of the mobile terminal since retrieving the banner ads from the local memory is much faster than downloading the banner ads from the Internet over a limited bandwidth communication channel.

The aspects of the present invention also improve the performance of a remote synchronization session to a target computer over a limited bandwidth communication channel. During the local synchronization session of FIG. 6A, the banner ads are transmitted and stored in the local memory of the mobile terminal. Because the bandwidth of the local communication channel (e.g., USB connection) is relatively wide, the banner ads are downloaded quickly into the mobile terminal. During a remote synchronization over a lower bandwidth communication channel (e.g., over a wireless connection), the rich text documents of interest are transmitted to the mobile terminal without the banner ad images, thereby reducing the time and cost to perform the remote synchronization. While the user is browsing off-line through the cached rich text documents, the appropriate banner ads are selected from the local memory for display with the rich text document.

In one embodiment, during the synchronization session the banner ads are downloaded to the mobile terminal from selected web sites. In another embodiment, the banner ads are downloaded to the mobile terminal from a banner server of an advertising agency. The mobile terminal tracks which rich text documents are displayed during on-line or off-line browsing sessions, together with which banner ads are selected from the local memory for display with the rich text document. In one embodiment, the mobile terminal also tracks "click-through" rates for each banner ad. During a synchronization session, the tracking information is transmitted from the mobile terminal to the web site or banner server so that the appropriate billing information for each banner advertiser can be generated, as well as the commission payments for each of the web site content providers.

In one embodiment, the banner ads are linked to other rich text documents that comprise information to the product or service being advertised. During the synchronization session, the linked rich text documents are transmitted to the mobile terminal over the first connection and stored in the local memory. During a browsing session, if the user clicks on a banner ad, the linked rich text document is retrieved from the local memory and displayed on the mobile terminal rather than downloading the linked rich text document from the Internet.

Figure 7A:
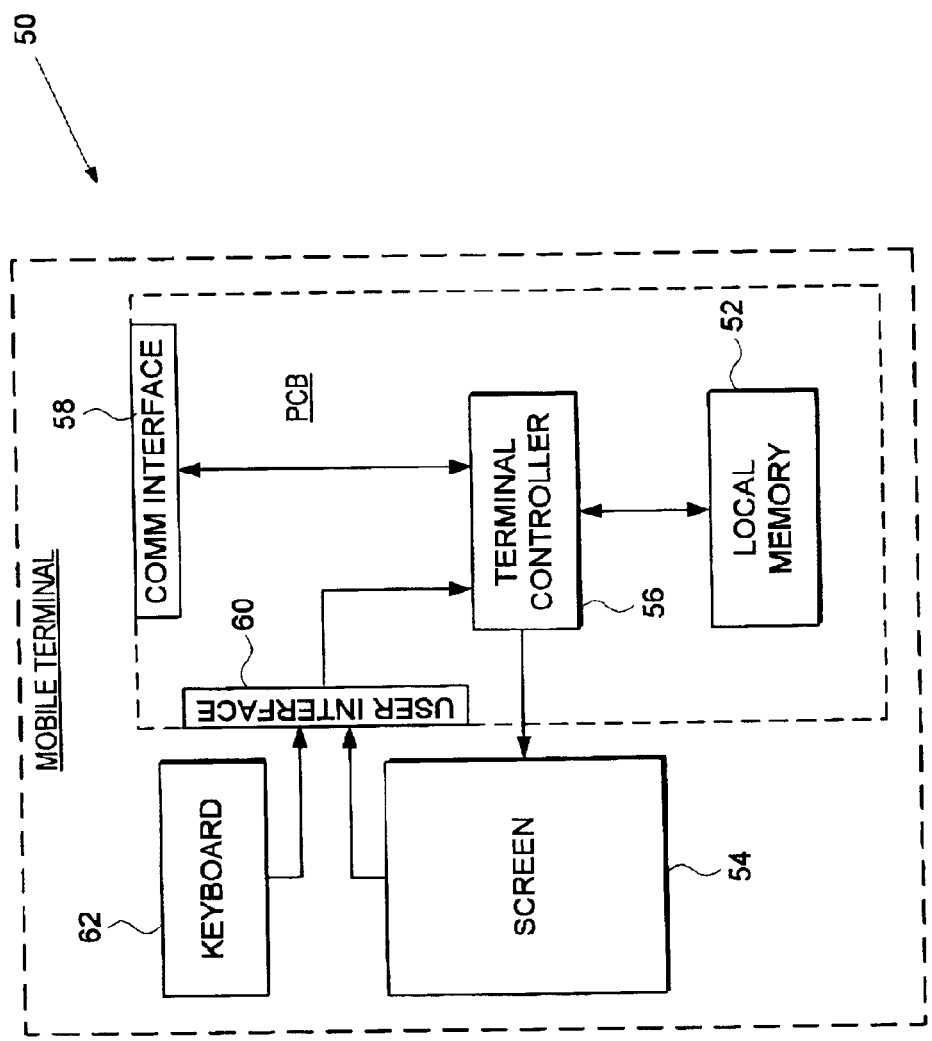
FIG. 7A shows a mobile terminal according to an embodiment of the present invention comprising a local memory for storing advertising information received over a first connection during a synchronization session and displayed during a browsing session with a rich text document received over a second connection.

FIG. 7A shows a mobile terminal 50 for communicating with a target computer according to an embodiment of the present invention. The mobile terminal 50 comprises a local memory 52 for storing advertising information received from the target computer over a first connection during a synchronization session. The mobile terminal 50 further comprises a screen 54 and a terminal controller 56. The terminal controller 56 for receiving a receiving rich text document over a second connection, wherein the rich text document comprises conditional code comprising advertising display criteria including a first identifier for retrieving selected advertising information stored in the local memory of the mobile terminal and a second identifier for downloading the selected advertising information from the Internet. The terminal controller 56 processes the first identifier in the rich text document to determine whether the selected advertising information associated with the rich text document is stored in the local memory 52 of the mobile terminal, and retrieves the selected advertising information if stored in the local memory 52 of the mobile terminal. If the selected advertising information is not stored in the local memory 52 of the mobile terminal, the terminal controller 56 processes the second identifier to download the selected advertising information from the Internet. The terminal controller 56 then displays the rich text document on the screen of the mobile terminal together with the selected advertising information. In the embodiment of FIG. 7A, the mobile terminal 50 further comprises a communication interface 58 for communicating with the target computer, and a user interface 60 for receiving user input from a keyboard 62 as well as the screen 54.

Figure 7B:
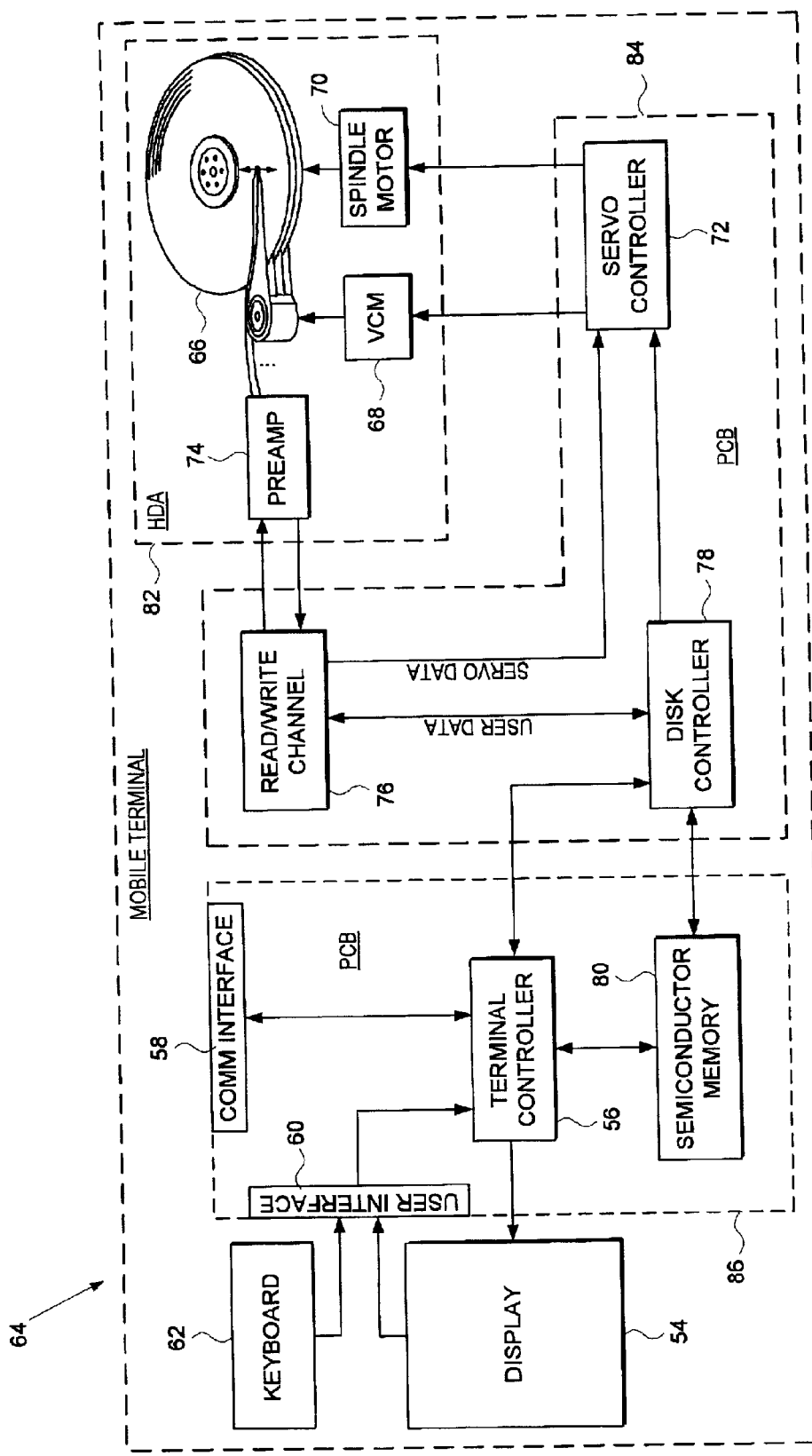
FIG. 7B shows a mobile terminal according to an embodiment of the present invention wherein the local memory comprises a disk.

FIG. 7B shows a mobile terminal 64 according to an embodiment of the present invention wherein the local memory comprises a disk 66. The mobile terminal 64 further comprises components for enabling the disk storage, including a voice coil motor (VCM) 68 and spindle motor 70, a servo controller 72, a preamp 74, a read/write channel 76, and a disk controller 78. In the embodiment of FIG. 7B, the mobile terminal 64 comprises semiconductor memory 80 that is shared by the terminal controller 56 and disk controller 78 to reduce the cost of the mobile terminal 64. In another embodiment, the terminal controller 56 executes a disk caching algorithm for caching data read from and written to the disk 66. In the embodiment of FIG. 7B, the disk 66, VCM 68, spindle motor 70 and preamp 74 are implemented within a head disk assembly (HDA) 82, the servo controller 72, read/write channel 76 and disk controller 78 are implemented on a first printed circuit board (PCB) 84, and the terminal controller 56 and semiconductor memory 80 are implemented on a second PCB 86. In an alternative embodiment, the servo controller 72, read/write channel 76, disk controller 78, terminal controller 56, and semiconductor memory 80 are implemented on a single PCB.

In one embodiment, the local memory of the mobile terminal (e.g., the disk 66 in FIG. 7B) stores a computer program comprising a code segment for receiving advertising information over a first connection during a synchronization session and storing the advertising information in the local memory of the mobile terminal. The computer program further comprises a code segment for receiving a rich text document over a second connection, wherein the rich text document comprises conditional code comprising advertising display criteria including a first identifier for retrieving selected advertising information stored in the local memory of the mobile terminal and a second identifier for downloading the selected advertising information from the Internet. The computer program further comprises a code segment for processing the first identifier in the rich text document to determine whether the selected advertising information associated with the rich text document is stored in the local memory of the mobile terminal, and retrieving the selected advertising information if stored in the local memory of the mobile terminal. The computer program further comprises a code segment for processing the second identifier to download the selected advertising information from the Internet if the selected advertising information is not stored in the local memory of the mobile terminal. The computer program further comprises a code segment for displaying the rich text document on the screen of the mobile terminal together with the selected advertising information.

We claim:

1. A method of operating a mobile terminal comprising a local memory and a screen, the method comprising the steps of:
    (a) during a synchronization session, receiving advertising information over a first connection and storing the advertising information in the local memory of the mobile terminal;
    (b) receiving a rich text document over a second connection, wherein the rich text document comprises conditional code comprising advertising display criteria including a first identifier for retrieving selected advertising information stored in the local memory of the mobile terminal and a second identifier for downloading the selected advertising information from the Internet;
    (c) processing the first identifier in the rich text document to determine whether the selected advertising information associated with the rich text document is stored in the local memory of the mobile terminal, and retrieving the selected advertising information if stored in the local memory of the mobile terminal;
    (d) if the selected advertising information is not stored in the local memory of the mobile terminal, processing the second identifier to download the selected advertising information from the Internet; and
    (e) displaying the rich text document on the screen of the mobile terminal together with the selected advertising information.

2. The method as recited in claim 1, wherein:
    (a) the first connection operates at a first bandwidth;
    (b) the second connection operates at a second bandwidth; and
    (c) the first bandwidth is substantially greater than the second bandwidth.

3. The method as recited in claim 2, wherein:
    (a) the first connection comprises a wired connection; and
    (b) the second connection comprises a wireless connection.

4. The method as recited in claim 1, wherein the conditional code comprises hypertext markup language (HTML) tags.

5. The method as recited in claim 4, wherein:
    (a) the first identifier comprises a first HTML tag; and
    (b) the second identifier comprises a second HTML tag.

6. The method as recited in claim 1, wherein the second identifier comprises a universal resource locator (URL).

7. The method as recited in claim 1, wherein the advertising display criteria comprises a location within the rich text document to display the advertising information.

8. The method as recited in claim 1, wherein the advertising information comprises a plurality of banner ads.

9. The method as recited in claim 8, wherein the banner ads are displayed with the rich text document in a predetermined rotation.

10. The method as recited in claim 9, wherein the banner ads are rotated each time the rich text document is redisplayed.

11. The method as recited in claim 9, wherein the banner ads are rotated at a predetermined interval while displaying the rich text document.

12. The method as recited in claim 8, wherein:
    (a) a type indicator is associated with each banner ad; and
    (b) the first identifier comprises a type indicator for selecting a banner ad from the local memory for display with the rich text document.

13. The method as recited in claim 1, wherein during the synchronization session personal information management (PIM) data is transmitted to the remote terminal.

14. The method as recited in claim 1, wherein the rich text document is transmitted to the mobile terminal over the second connection during a subsequent synchronization session.

15. The method as recited in claim 1, wherein the rich text document is transmitted to the mobile terminal over the second connection during a browsing session.

16. The method as recited in claim 1, further comprising the steps of:
    (a) evaluating the inventory of advertising information stored in the local memory of the mobile terminal; and
    (b) selectively transmitting updated advertising information to the mobile terminal relative to the inventory of advertising information stored in the local memory of the mobile terminal.

17. The method as recited in claim 16, wherein the updated advertising information displaces outdated advertising information stored on the mobile terminal.

18. The method as recited in claim 1, further comprising the steps of:
(a) storing in the local memory of the mobile terminal tracking information identifying the advertising information retrieved from the local memory and displayed with the rich text document; and
(b) transmitting the tracking information from the mobile terminal to a target computer.

19. The method as recited in claim 18, wherein the tracking information further comprises click-through data indicating a click-through rate for the advertising information displayed with the rich text document.

20. The method as recited in claim 1, wherein:
(a) the advertising information comprises linked rich text documents; and
(b) during the synchronization session, the linked rich text documents are transmitted to the mobile terminal over the first connection and stored in the local memory.

21. A mobile terminal for communicating with a target computer, the mobile terminal comprising:
(a) a local memory for storing advertising information received from the target computer over a first connection during a synchronization session;
(b) a screen; and
(c) a terminal controller for:
receiving rich text document over a second connection, wherein the rich text document comprises conditional code comprising advertising display criteria including a first identifier for retrieving selected advertising information stored in the local memory of the mobile terminal and a second identifier for downloading the selected advertising information from the Internet;
processing the first identifier in the rich text document to determine whether the selected advertising information associated with the rich text document is stored in the local memory of the mobile terminal, and retrieving the selected advertising information if stored in the local memory of the mobile terminal;
if the selected advertising information is not stored in the local memory of the mobile terminal, processing the second identifier to download the selected advertising information from the Internet; and
displaying the rich text document on the screen of the mobile terminal together with the selected advertising information.

22. The mobile terminal as recited in claim 21, wherein:
(a) the first connection operates at a first bandwidth;
(b) the second connection operates at a second bandwidth; and
(c) the first bandwidth is substantially greater than the second bandwidth.

23. The mobile terminal as recited in claim 22, wherein:
(a) the first connection comprises a wired connection; and
(b) the second connection comprises a wireless connection.

24. The mobile terminal as recited in claim 21, wherein the conditional code comprises hypertext markup language (HTML) tags.

25. The mobile terminal as recited in claim 24, wherein:
(a) the first identifier comprises a first HTML tag; and
(b) the second identifier comprises a second HTML tag.

26. The mobile terminal as recited in claim 21, wherein the second identifier comprises a universal resource locator (URL).

27. The mobile terminal as recited in claim 21, wherein the advertising information comprises advertising display criteria for displaying the advertising information within the rich text document.

28. The mobile terminal as recited in claim 21, wherein the advertising information comprises a plurality of banner ads.

29. The mobile terminal as recited in claim 28, wherein the banner ads are displayed with the rich text document in a predetermined rotation.

30. The mobile terminal as recited in claim 28, wherein the banner ads are rotated each time the rich text document is redisplayed.

31. The mobile terminal as recited in claim 28, wherein the banner ads are rotated at a predetermined interval while displaying the rich text document.

32. The mobile terminal as recited in claim 28, wherein:
(a) a type indicator is associated with each banner ad; and
(b) the first identifier comprises a type indicator for selecting a banner ad from the local memory for display with the rich text document.

33. The mobile terminal as recited in claim 21, wherein during the synchronization session the mobile terminal receives personal information management (PIM) data from the target computer over the first connection.

34. The mobile terminal as recited in claim 21, wherein the rich text document is transmitted to the mobile terminal over the second connection during a subsequent synchronization session.

35. The mobile terminal as recited in claim 21, wherein the rich text document is transmitted to the mobile terminal over the second connection during a browsing session.

36. The mobile terminal as recited in claim 21, wherein:
(a) during the synchronization session the inventory of advertising information stored in the local memory of the mobile terminal is evaluated; and
(b) updated advertising information is selectively transmitted to the mobile terminal relative to the inventory of advertising information stored in the local memory of the mobile terminal.

37. The mobile terminal as recited in claim 36, wherein the updated advertising information displaces outdated advertising information stored on the mobile terminal.

38. The mobile terminal as recited in claim 21, wherein the terminal controller for:
(a) storing in the local memory of the mobile terminal tracking information identifying the advertising information retrieved from the local memory and displayed with the rich text document; and
(b) transmitting the tracking information from the mobile terminal to a target computer.

39. The mobile terminal as recited in claim 38, wherein the tracking information further comprises click-through data indicating a click-through rate for the advertising information displayed with the rich text document.

40. The mobile terminal as recited in claim 21, wherein:
(a) the advertising information comprises linked rich text documents; and
(b) during the synchronization session, the linked rich text documents are transmitted to the mobile terminal over the first connection and stored in the local memory.

41. A computer program embodied on a computer readable storage medium for use in a mobile terminal comprising a local memory and a screen, the computer program comprising code segments for:

(a) during a synchronization session, receiving advertising information over a first connection and storing the advertising information in the local memory of the mobile terminal;

(b) receiving a rich text document over a second connection, wherein the rich text document comprises conditional code comprising advertising display criteria including a first identifier for retrieving selected advertising information stored in the local memory of the mobile terminal and a second identifier for downloading the selected advertising information from the Internet;

(c) processing the first identifier in the rich text document to determine whether the selected advertising information associated with the rich text document is stored in the local memory of the mobile terminal, and retrieving the selected advertising information if stored in the local memory of the mobile terminal;

(d) if the selected advertising information is not stored in the local memory of the mobile terminal, processing the second identifier to download the selected advertising information from the Internet; and (a) displaying the rich text document on the screen of the mobile terminal together with the selected advertising information.

42. The computer program as recited in claim 41, wherein:

(a) the first connection operates at a first bandwidth;

(b) the second connection operates at a second bandwidth; and (c) the first bandwidth is substantially greater than the second bandwidth.

43. The computer program as recited in claim 42, wherein:

(a) the first connection comprises a wired connection; and (b) the second connection comprises a wireless connection.

44. The computer program as recited in claim 41, wherein the conditional code comprises hypertext markup language (HTML) tags.

45. The computer program as recited in claim 44, wherein:

(a) the first identifier comprises a first HTML tag; and (b) the second identifier comprises a second HTML tag.

46. The computer program as recited in claim 41, wherein the second identifier comprises a universal resource locator (URL).

47. The computer program as recited in claim 41, wherein the advertising display criteria comprises a location within the rich text document to display the advertising information.

48. The computer program as recited in claim 41, wherein the advertising information comprises a plurality of banner ads.

49. The computer program as recited in claim 48, wherein the banner ads are displayed with the rich text document in a predetermined rotation.

50. The computer program as recited in claim 48, wherein the banner ads are rotated each time the rich text document is redisplayed.

51. The computer program as recited in claim 48, wherein the banner ads are rotated at a predetermined interval while displaying the rich text document.

52. The computer program as recited in claim 41, wherein:

(a) a type indicator is associated with each banner ad; and (b) the first identifier comprises a type indicator for selecting a banner ad from the local memory for display with the rich text document.

53. The computer program as recited in claim 41, wherein during the synchronization session personal information management (PIM data is transmitted to the remote terminal.

54. The computer program as recited in claim 41, wherein the rich text document is transmitted to the mobile terminal over the second connection during a subsequent synchronization session.

55. The computer program as recited in claim 41, wherein the rich text document is transmitted to the mobile terminal over the second connection during a browsing session.

56. The computer program as recited in claim 41, further comprising code segments for:

(a) evaluating the inventory of advertising information stored in the local memory of the mobile terminal; and (b) selectively transmitting updated advertising information to the mobile terminal relative to the inventory of advertising information stored in the local memory of the mobile terminal.

57. The computer program as recited in claim 56, wherein the updated advertising information displaces outdated advertising information stored on the mobile terminal.

58. The computer program as recited in claim 41, further comprising code segments for:

(a) storing in the local memory of the mobile terminal tracking information identifying the advertising information retrieved from the local memory and displayed with the rich text document; and (b) transmitting the tracking information from the mobile terminal to a target computer.

59. The computer program as recited in claim 58, wherein the tracking information further comprises click-through data indicating a click-through rate for the advertising information displayed with the rich text document.

60. The computer program as recited in claim 41, wherein:

(a) the advertising information comprises linked rich text documents; and (b) during the synchronization session, the linked rich text documents are transmitted to the mobile terminal over the first connection and stored in the local memory.

61. A method of transmitting data to a mobile terminal, the mobile terminal comprising a local memory and a screen, the method comprising the steps of:

(a) during a synchronization session, transmitting advertising information to the mobile terminal over a first connection, the local memory of the mobile terminal for storing the advertising information; and (b) transmitting a rich text document to the mobile terminal over a second connection, wherein the rich text document comprises conditional code comprising advertising display criteria including a first identifier for retrieving selected advertising information stored in the local memory of the mobile terminal and a second identifier for downloading the selected advertising information from the Internet.

62. A computer program embodied on a computer readable storage medium for transmitting data to a mobile terminal, the mobile terminal comprising a local memory and a screen, the computer program comprising code segments for:

(a) during a synchronization session, transmitting advertising information to the mobile terminal over a first connection, the local memory of the mobile terminal for storing the advertising information; and (b) transmitting a rich text document to the mobile terminal over a second connection, wherein the rich text document comprises conditional code comprising advertising display criteria including a first identifier for retrieving selected advertising information stored in the local memory of the mobile terminal and a second identifier for downloading the selected advertising information from the Internet.

* * * * *

UNITED STATES PATENT AND TRADEMARK OFFICE
CERTIFICATE OF CORRECTION

PATENT NO.        : 6,892,217 B1                                      Page 1 of 1
APPLICATION NO.   : 09/888275
DATED             : June 22, 2001
INVENTOR(S)       : Jonathan Lee Hanmann et al.

It is certified that error appears in the above-identified patent and that said Letters Patent is hereby corrected as shown below:

On the Title Page, line (73) Assignee:

Please delete "Western Digital Technologies, Inc., Lake Forest, CA (US)" and replace therefore with -- Western Digital Ventures, Inc., Lake Forest, CA (US) --.

Signed and Sealed this

Eighteenth Day of September, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,892,217 B1 | Page 1 of 1 |
| APPLICATION NO. | : 09/888275 | |
| DATED | : May 10, 2005 | |
| INVENTOR(S) | : Jonathan Lee Hanmann et al. | |

It is certified that error appears in the above-identified patent and that said Letters Patent is hereby corrected as shown below:

On the Title Page, line (73) Assignee:

Please delete "Western Digital Technologies, Inc., Lake Forest, CA (US)" and replace therefore with -- Western Digital Ventures, Inc., Lake Forest, CA (US) --.

This certificate supersedes Certificate of Correction issued September 18, 2007.

Signed and Sealed this

Ninth Day of October, 2007

JON W. DUDAS
*Director of the United States Patent and Trademark Office*